Aug. 15, 1961 R. L. KOSSON ET AL 2,995,892
SUPERSONIC VARIABLE INLET
Filed Feb. 27, 1957
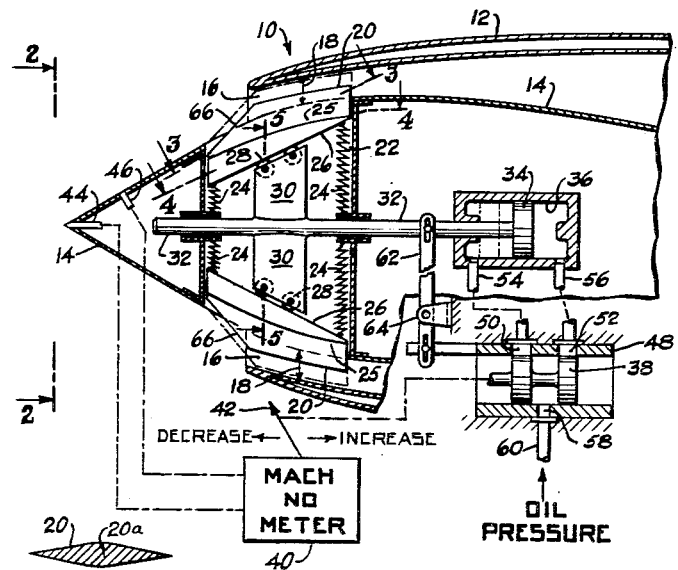
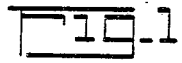
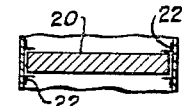
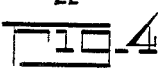
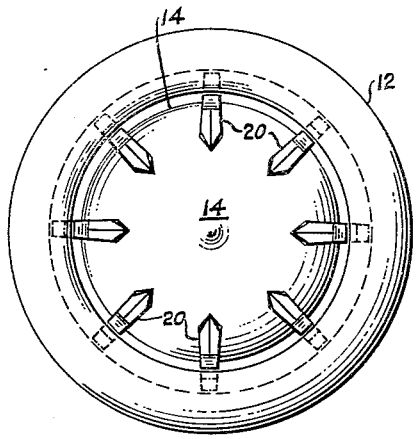
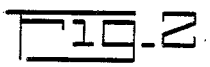
INVENTORS
ROBERT L. KOSSON
RAYMOND F. SCHAEFER
BY
ATTORNEY

United States Patent Office 2,995,892
Patented Aug. 15, 1961

2,995,892
SUPERSONIC VARIABLE INLET
Robert L. Kosson, Clifton, and Raymond F. Schaefer, North Caldwell, N.J., assignors to Curtiss-Wright Corporation, a corporation of Delaware
Filed Feb. 27, 1957, Ser. No. 642,777
2 Claims. (Cl. 60—35.6)

This invention relates to air inlets for air breathing jet engines and is particularly directed to a variable area air inlet construction.

At supersonic flight speeds of air breathing jet engines it is generally desirable for the engine to operate with its air inlet in a started condition in order to reduce the drag and to provide for maximum air flow into the engine. An air inlet, to which air approaches at supersonic velocity is said to have "started" when the shock region marking the transition from supersonic to subsonic flow of the entering air is at or downstream of the inlet throat region. Starting of such an inlet is facilitated if the inlet area contraction from the inlet entrance to the inlet throat is small. With a given contraction from a particular inlet opening the inlet will start easier at higher supersonic speeds. Also the inlet pressure recovery increases with increase in said contraction, that is with decrease in the area of the inlet throat for a particular inlet entrance opening. Hence at low supersonic speeds the inlet throat, for a particular inlet entrance opening, should be such as to provide only a relatively small contraction in the inlet passage area from the entrance opening, whereas at higher supersonic speeds the inlet will start with a greater contraction, that is, with a smaller throat area. It is desirable therefore, with an inlet of a particular inlet entrance opening, to reduce the throat area of the inlet at higher supersonic speeds in order to increase the inlet pressure recovery.

An object of the present invention comprises the provision of a novel and simple variable area air inlet construction. A further object of the invention comprises the provision of means for automatically decreasing the inlet throat area with increase in the supersonic flight speed of the engine.

Specifically the invention comprises a plurality of elements disposed at the inlet throat and movable for varying the inlet throat area so that the throat area is a minimum at the higher supersonic speeds and is a maximum at the lower supersonic speeds.

Other objects of the invention will become apparent upon reading the annexed detailed description in connection with the drawing in which:

FIG. 1 is a schematic axial sectional view of a jet engine air inlet embodying the invention and showing the movable inlet vanes in an intermediate position; and FIGS. 2, 3, 4 and 5 are sectional views taken along lines 2—2, 3—3, 4—4 and 5—5 of FIG. 1.

Referring to the drawing, reference numeral 10 designates the front or air inlet end of an air breathing jet engine designed for flight at supersonic speeds. The engine may for example be a ramjet or turbojet engine. The engine inlet end includes a tubular duct structure 12 and a centerbody 14 co-axially mounted therein to form an annular air inlet passage 16. The shape of the inlet passage 16 is such as to provide the inlet with a minimum area or throat section in the region indicated by the dot and dash line 18.

A plurality of circumferentially-spaced strut-like vanes 20 are radially movable out through slots in the centerbody 14 so as to extend across the passage 16. Eight vanes 20 are illustrated but as will appear the invention is not limited to this particular number. The vanes 20 are urged toward their inward or retracted positions by springs 24 in which positions said vanes are completely withdrawn out of the air flow path through the passage 16. The vanes 20 are movable radially outwardly from their retracted positions so that the outer portion of each vane is arranged to extend at least part-way across the passage 16. As shown by their dot and dash line position in FIG. 1 the vanes 20 may be arranged for extension substantially completely across the inlet passage 16.

The portion of each vane 20 which is arranged to extend across the passage 16 is streamlined in cross-section for supersonic flow so that, as seen in FIG. 3, it has sharp leading and trailing edges and has a relatively thick intermediate portion. The inner or shank portion of each vane 20 is rectangular in cross-section to form a sliding fit in a radial guideway 22 in the centerbody 14.

Each guideway 22 is formed so as to be below the surface of said centerbody and each vane 20 is formed so that its rectangular shank portion is disposed completely within the centerbody even when the vanes are fully extended, the outer edge of said rectangular shank portion being indicated at 25. This arrangement facilitates the provision of a suitable seal between the centerbody and each vane at the centerbody surface to prevent air leakage into the centerbody from the passage 16.

The inner end of the shank portion of each vane 20 has an inclined cam surface 26 engaged by cam follower rollers 28 carried at the outer ends of arms 30 forming a spider structure on a shaft 32. The shaft 32 forms the piston rod of a piston 34 slidable in a cylinder 36. The arrangement is such that movement of the piston 34 to the left to the dot and dash position in FIG. 1 is effective to move or extend the vanes 20 outwardly across the passage 16 against the force exerted on said vanes by the springs 24. Opposite movement of said piston, that is to the right in FIG. 1, is effective to permit the springs to retract the vanes 20. Unless otherwise specified the words "right" and "left" used herein refer to the position or movement of the parts as viewed in FIG. 1.

The piston and cylinder assembly 34, 36 comprises a hydraulic motor controlled by a servo valve 38. The servo valve 38 is operatively connected to a meter 40 having an arm 42 movable in response to changes in the flight speed Mach No. For this purpose the meter 40 may be responsive to the impact pressure of the air approaching the engine as measured by the total head tube 44 and to the static pressure of said air as measured by the static pressure tube 46. The details of the Mach No. meter 40 form no part of the present invention.

A slidable sleeve 48 is disposed between the servo valve 38 and its housing structure. The sleeve 48 has radial ports 50 and 52 disposed for communication with conduits 54 and 56 respectively, said conduits in turn communicating with the left and right ends of the cylinder 36. The sleeve 48 also has a radial port 58 communicating with a conduit 60 to which a suitable fluid, such as oil, is supplied under pressure. A lever 62 pivotally supported intermediate its ends at 64 is pivotally connected to the shaft 32 at one end and to the sleeve 48 at its other end.

With the aforedescribed structure when the flight speed Mach No. is below a predetermined supersomic value, the Mach No. meter 40 positions the servo valve 38 sufficiently far to the left to admit oil pressure from the conduit 60 through ports 58 and 50 and conduit 54 to the left end of the cylinder 36. At the same time the opposite end of the cylinder 36 is vented through the conduit 56, port 52 and the right end of the sleeve 48. This pressure in the left end of the cylinder forces the piston 34 to the right end of its stroke whereupon the vanes 20 are fully retracted into the centerbody 14 and out of the air inlet passage 16.

As the engine flight speed increases, the Mach No.

meter 40 moves the servo valve 38 toward the right. When said flight speed exceeds a predetermined supersonic value the valve 38 moves sufficiently far to the right to place the port 52 in communication with the inlet port 58. Oil under pressure is now admitted from conduit 60 through ports 58 and 52 and conduit 56 to the right end of the cylinder 36. At the same time the left end of the cylinder 36 is vented through conduit 54 port 50 and the left end of the sleeve 48. Accordingly, the oil pressure in the right end of the cylinder 36 is effective to move the piston 34 toward the left whereupon, through the co-action of the cam followers 28 with the cam surface 26, the vanes 20 are extended across the inlet passage 16.

Since the piston shaft 32 and servo valve sleeve 48 are interconnected by the lever 62, motion of the piston 34 to the left is accompanied by motion of said sleeve to the right. Accordingly, the piston 34 moves until the servo valve sleeve is positioned, as illustrated, in its neutral position relative to the servo valve 38 in which the sleeve ports 50 and 52 are closed by the servo valve 38. Thus the vanes 20 are extended an amount which depends on the extent to which the flight speed Mach No. exceeds said predetermined supersonic value. Upon a reduction in flight speed, the vanes 20 are retracted until at said predetermined speed the vanes are fully retracted and they remain fully retracted at all lower flight speeds.

Since the total head tube 44 is disposed at the nose of the centerbody 14 the Mach No. meter 40 not only indicates the flight speed but it also measures the flow velocity of the air flow entering the inlet relative to said centerbody.

If desired the mechanism can be designed to provide just two positions for the vanes, either fully retracted or fully extended. This can be accomplished simply by eliminating the lever 62 interconnecting the piston 34 and the servo valve sleeve 48.

As illustrated in FIG. 3 and as previously stated the portion of each vane 20 which is arranged to extend across the inlet passage 16 has a streamlined cross-section in the direction of the air flow through said air inlet passage so that the intermediate portion of each vane 20 between its leading and trailing edges is relatively thick. The vanes 20 are positioned at the throat section 18 of the air inlet passage 16 so that said thick intermediate portion 20a of each vane is disposed at said throat section. With this arrangement, extension of the vanes 20 is effective to cause a reduction in the cross-sectional area of the throat section 18 of the inlet passage 16. Hence the vanes 20 are extendable and retractable to vary the minimum or throat area of the inlet passage 16.

The amount of area reduction desired of the inlet throat region is a function of the supersonic Mach No. range over which the inlet is required to operate. Also, the number of the vanes 20 and their size is such that substantially all of the inlet throat region is disposed on the downstream side of the shock waves off the leading edges of the vanes.

With the system described the vanes 20 are completely retracted out of the air inlet passage when the flight speed is below a predetermined supersonic Mach No. Hence below said predetermined flight Mach No. the adjustable throat area of the inlet passage 16 is a maximum value. At flight speeds above said predetermined supersonic value however the system is operative to extend the vanes 20 so as to reduce said throat area and said throat area is a minimum value when the vanes 20 are completely extended.

The leading edge 66 of the portion of each vane 20 which is arranged to extend across the air inlet passage 16 preferably is inclined as illustrated so that the inner end of said leading edge is disposed upstream of the outer end portion of said leading edge. This inclination facilitates starting of the inlet when the vanes 20 are extended and also minimizes possible adverse effects from the interaction of boundary layer air on the outer end surface of the vanes 20 with the adjacent wall of the duct structure 12 particularly when the vanes 20 are in their partially extended positions.

With the vanes 20 fully extended, the outer end of the leading edge of each vane 20 preferably should be adjacent to the forward end of the duct structure 12. Thus, in the extended position of each vane 20, if the outer end of its leading edge were disposed upstream of the forward end of duct structure 12 then said vane might interfere with the oblique shock off the centerbody. On the other hand if the outer end of the leading edge of each vane 20 were disposed downstream of the forward end of the duct structure 12 then excessive interference between the shock waves from said leading edge and the boundary layer of air in the passage 16 along said duct structure might result.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A jet engine air inlet construction comprising means providing an air inlet passageway having facing walls forming a throat section downstream of its inlet end; a plurality of elements disposed at said throat section; said elements being movable to vary the cross-sectional area of said inlet throat section and having a retracted position in which they are withdrawn into one of said walls from said inlet passageway so as not to further restrict said throat section and having a second position in which they extend from said one wall at least part-way across said inlet passageway toward said other wall to further restrict said throat section, the portion of each element arranged to extend across said passageway having sharp leading and trailing edges and having a relatively thick intermediate portion disposed substantially at said inlet throat section when said element is extended, each said element being formed so that in its extended position its leading edge is inclined to the general direction of flow through said air inlet passageway with the outer end of each such leading edge being disposed downstream of its inner end and with its said outer end being disposed approximately at the forward end of said other wall of the air inlet passageway; flight speed measuring means; and means responsive to said engine flight speed measuring means and operatively connected to said movable elements for maintaining said elements in their retracted positions at supersonic flight speeds below a predetermined value and for moving said elements toward their extended positions at higher supersonic flight speeds for further restricting said throat section.

2. A jet engine air inlet construction comprising a duct-like member having a centerbody disposed therein adjacent to the forward end of said duct-like member to form an annular inlet passageway with a throat section downstream of the forward end of said duct-like member; a plurality of circumferentially-spaced movable elements carried by said centerbody, said elements being movable to an extended position in which they extend substantially across said inlet passageway at said throat section to further restrict the area of said throat section with the portion of each element extending across said passageway having sharp leading and trailing edges and a relatively thick intermediate portion at said throat section, said elements also being movable to a retracted position in which they are withdrawn out of the flow path of said passageway, and each said element being formed so that in its extended position its leading edge is inclined to the general direction of flow through said passageway with the outer end of each such leading edge being disposed downstream of its inner end and with its outer end being disposed approximately at the forward end of said duct-like member, velocity measuring means at the inlet for measuring the velocity of the entering air flow; and means responsive to said measuring means and operatively connected to said movable elements for maintaining said elements in their retracted positions at supersonic velocities of the entering air flow below a predetermined supersonic velocity and for moving said elements toward their extended positions at higher supersonic entering velocities for further restricting said throat section.

References Cited in the file of this patent

UNITED STATES PATENTS

| | | |
|---|---|---|
| 2,570,847 | Ovens | Oct. 9, 1951 |
| 2,572,723 | Hildestad | Oct. 23, 1951 |
| 2,610,464 | Knoll | Sept. 16, 1952 |
| 2,671,620 | Andrews | Mar. 9, 1954 |
| 2,675,670 | Tenney | Apr. 20, 1954 |
| 2,763,426 | Erwin | Sept. 18, 1956 |
| 2,772,620 | Ferri | Dec. 4, 1956 |
| 2,829,490 | Kresse | Apr. 8, 1958 |
| 2,870,601 | Demetriades | Jan. 27, 1959 |
| 2,876,621 | Bogert et al. | Mar. 10, 1959 |
| 2,934,898 | Graefe | May 3, 1960 |

FOREIGN PATENTS

| | | |
|---|---|---|
| 614,548 | Great Britain | Dec. 17, 1948 |
| 750,420 | Great Britain | June 13, 1956 |